United States Patent
Kim et al.

(10) Patent No.: US 10,031,655 B2
(45) Date of Patent: Jul. 24, 2018

(54) DEVICE FOR PERFORMING A DIGITAL LIVING NETWORK ALLIANCE (DLNA) SERVICE SCENARIO

(71) Applicant: SK TELECOM CO., LTD., Seoul (KR)

(72) Inventors: Gyu-baek Kim, Seoul (KR); Youn-soon Oh, Seoul (KR); Yong-hee Han, Suwon-si (KR); Woon-sik Lee, Seoul (KR); Hye-min Lee, Seongnam-si (KR); Hyu-dae Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 488 days.

(21) Appl. No.: 14/629,152

(22) Filed: Feb. 23, 2015

(65) Prior Publication Data
US 2015/0169210 A1     Jun. 18, 2015

Related U.S. Application Data

(63) Continuation of application No. PCT/KR2013/007506, filed on Aug. 21, 2013.

(30) Foreign Application Priority Data

Aug. 22, 2012 (KR) .................. 10-2012-0091693

(51) Int. Cl.
*G06F 3/0484* (2013.01)
*G06F 3/0481* (2013.01)
(Continued)

(52) U.S. Cl.
CPC ........ *G06F 3/04847* (2013.01); *G06F 3/0481* (2013.01); *G06F 3/04842* (2013.01);
(Continued)

(58) Field of Classification Search
CPC .................................................. G06F 3/04847
(Continued)

(56) References Cited

U.S. PATENT DOCUMENTS 6,366,906 B1 * 4/2002 Hoffman ........... G06F 17/30637
6,727,921 B1 * 4/2004 Valad ................. G06F 3/04847
715/810

(Continued)

FOREIGN PATENT DOCUMENTS

CN     101646992 A     2/2010
CN     102063429     *     5/2011
(Continued)

OTHER PUBLICATIONS

International Search Report for PCT/KR2013/007506 dated Dec. 16, 2013, citing the above reference(s).
(Continued)

*Primary Examiner* — Reza Nabi
(74) *Attorney, Agent, or Firm* — Hauptman Ham, LLP

(57) ABSTRACT

A DLNA device for performing a DLNA service scenario, comprises a display unit, an input unit, a communicator and a controller. The display unit is configured to display a user interface for performing the DLNA service scenario. The input unit is configured to receive, from a user, an operational instruction for the user interface. The communicator is configured to communicate with a DLNA network. The controller is configured to control the user interface displayed on the display unit and control the communicator. The user interface is configured to include a main layer providing an interface for media content selection, a first sublayer providing an interface for media server selection, and a second sublayer providing an interface for media player selection. The first sublayer and the second sublayer
(Continued)

are displayed temporarily on at least a portion of the main layer according to the operational instruction.

20 Claims, 10 Drawing Sheets

(51) Int. Cl.
G11B 27/031 (2006.01)
G11B 27/11 (2006.01)
G11B 27/34 (2006.01)
(52) U.S. Cl.
CPC ............ *G11B 27/031* (2013.01); *G11B 27/11* (2013.01); *G11B 27/34* (2013.01)
(58) Field of Classification Search
USPC .......................................................... 715/717
See application file for complete search history.

(56) References Cited

U.S. PATENT DOCUMENTS

| | | | | |
|---|---|---|---|---|
| 8,239,239 | B1* | 8/2012 | Malhotra | G06Q 10/0633 705/7.27 |
| 9,607,083 | B2* | 3/2017 | Gomes-Casseres | G06F 17/3074 |
| 2005/0021245 | A1* | 1/2005 | Furuno | E02F 9/205 702/33 |
| 2007/0150828 | A1* | 6/2007 | Tsukada | G06F 17/30058 715/777 |
| 2008/0172411 | A1* | 7/2008 | Kikuchi | G06F 17/30174 |
| 2009/0177971 | A1* | 7/2009 | Kim | H04L 67/02 715/739 |
| 2009/0240785 | A1* | 9/2009 | Kikkawa | H04L 29/12424 709/218 |
| 2009/0300679 | A1* | 12/2009 | Hiroi | H04L 12/2812 725/40 |
| 2009/0327241 | A1* | 12/2009 | Douillet | G06F 17/30029 |
| 2010/0122177 | A1* | 5/2010 | Yoshioka | H04L 12/282 715/738 |
| 2010/0211979 | A1* | 8/2010 | Konno | H04N 21/4122 725/59 |
| 2010/0302172 | A1* | 12/2010 | Wilairat | G06F 3/04883 345/173 |
| 2011/0126116 | A1* | 5/2011 | Lee | G08C 17/00 715/739 |
| 2011/0296339 | A1* | 12/2011 | Kang | G06F 3/04815 715/782 |
| 2012/0151006 | A1* | 6/2012 | McInerney | H04L 12/2818 709/219 |
| 2012/0158984 | A1 | 6/2012 | Maitre et al. | |
| 2012/0232684 | A1* | 9/2012 | Lee | H04N 21/4302 700/94 |
| 2013/0054795 | A1* | 2/2013 | Kang | H04L 65/4084 709/224 |
| 2013/0125192 | A1* | 5/2013 | Li | H04N 21/4122 725/118 |
| 2014/0006562 | A1* | 1/2014 | Handa | H04L 29/0809 709/219 |
| 2014/0240343 | A1* | 8/2014 | Tremblay | G06T 11/001 345/594 |
| 2014/0277651 | A1* | 9/2014 | Gomes-Casseres | G06F 17/3074 700/94 |
| 2015/0082225 | A1* | 3/2015 | Shearer | G06F 3/0482 715/771 |
| 2015/0100623 | A1* | 4/2015 | Gudell | H04L 67/42 709/203 |
| 2015/0169210 | A1* | 6/2015 | Kim | G06F 3/0481 715/717 |
| 2015/0199082 | A1* | 7/2015 | Scholler | G06F 3/0485 715/786 |
| 2015/0229696 | A1* | 8/2015 | Kim | H04N 21/43615 709/219 |
| 2016/0349960 | A1* | 12/2016 | Kumar | G06F 3/04817 |
| 2016/0378318 | A1* | 12/2016 | Tsuju | G06F 3/0488 715/835 |

FOREIGN PATENT DOCUMENTS

| | | |
|---|---|---|
| CN | 102063429 A | 5/2011 |
| CN | 102572606 A | 7/2012 |
| KR | 100663448 B1 | 12/2006 |
| KR | 1020100117396 A | 11/2010 |
| KR | 20110052996 * | 5/2011 |
| KR | 1020110052996 A | 5/2011 |
| KR | 1020120058051 A | 6/2012 |

OTHER PUBLICATIONS

Chinese Office Action dated Mar. 23, 2017 in connection with the counterpart Chinese Patent Application No. 201380044444.9, citing the above reference(s).

Chinese Office Action dated Aug. 9, 2017 in connection with the corresponding counterpart Chinese Patent Application No. 201380044444.9 citing the above reference(s).

* cited by examiner

US 10,031,655 B2

DEVICE FOR PERFORMING A DIGITAL LIVING NETWORK ALLIANCE (DLNA) SERVICE SCENARIO

CROSS-REFERENCE TO RELATED APPLICATION

The present application is a continuation of International Patent Application No. PCT/KR2013/007506, filed Aug. 21, 2013, which is based on and claims priority to Korean Patent Application No. 10-2012-0091693, filed on Aug. 22, 2012. The disclosures of above-listed applications are hereby incorporated by reference in their entirely.

TECHNICAL FIELD

The present disclosure relates to an apparatus for providing a user interface for sharing media content in a home network and a recording medium for recording programs.

BACKGROUND

The statements in this section merely provide background information related to the present disclosure and do not necessarily constitute prior art.

Recently, home networks are established to enable interconnections and integral management of various devices installed in customer premises such as a PC, a TV, a set-top box, a mobile device, an audio system, an air conditioner, a boiler, lights, a gas valve and a front door.

As a protocol for standardization related to sharing of media content in a home network, the Digital Living Network Alliance (DLNA) is emerging. The DLNA aims to build a platform ensuring inter-compatibility, based on industry standards. The DLNA, which is based on Universal Plug-and-Play (UPnP) technology, covers standardization of physical media, network transmission, media formats, streaming protocols, Digital Rights Management (DRM), etc. The DLNA is expected to introduce guidelines based on industry standards such as IP, HTTP, UPnP and Wi-Fi which are widely used for home appliances, PCs, wireless devices, etc. Devices designed according to the DLNA guidelines are allowed to freely share various kinds of media content including music, pictures and videos over a home network.

Where various devices in customer premises share such media content, there is a need to allow users to more easily and conveniently operate devices connected to their home network.

The DLNA defines a Digital Media Server (hereinafter, referred to as "DMS"), a Digital Media Player (hereinafter, referred to as "DMP"), a Digital Media Renderer (hereinafter, referred to as "DMR"), and a Digital Media Controller (hereinafter, referred to as "DMC"), which are device classes sharing and controlling media over a home network.

Briefly, a DMS device serves to register and distribute local content in a network, and a DMP device serves to find content registered by the DMS device and plays the content on the player thereof. A DMR device receives and plays content according to a request from a DMC device, which finds the content registered by the DMS device. The DMC device establishes configurations for playback in the DMR device, and maintains connection between the DMR and DMS devices.

The DLNA standard defines three scenarios in relation to basic DLNA services. The DLNA service scenarios include 2-Box Push, 2-Box Pull and 3-Box scenarios.

FIG. 1A is an examplary diagram of basic DLNA service scenario illustrating a 2-Box Push scenario. As illustrated in FIG. 1A, a content of a device 110 is played on another device 120 and the device 110 serves as a DMS device.

FIG. 1B is an examplary diagram of basic DLNA service scenario illustrating a 2-Box Pull scenario. As illustrated in FIG. 1B, a principal device 130 plays media of another device 110 and serves as a DMP device.

FIG. 1C is an examplary diagram of basic DLNA service scenario illustrating a 3-Box scenario. As illustrated in FIG. 1C, a principal device 140 serving as a DMC device causes media of another device 110 to be played by yet another device 120.

To support such DLNA service scenarios, DLNA service applications are provided by, for example, individual multimedia device manufacturers. In order to make DLNA services for users, the DLNA service applications need to integrally support the three DLNA service scenarios above and to be equipped with an intuitive user interface.

FIG. 2A is an examplary diagram of a user interface with three separate pages of a DLNA service application.

As illustrated in FIG. 2A, the user interface with screen transitions implements active screen areas for selecting a media server, media content and a media player with three separate pages to perform the 3-Box scenario.

In this case, a configuration of the user interface requires the user to turn over several pages to perform the 3-Box scenario, which is a non-intuitive manner of presentation. Moreover, the inventor(s) has experienced that the user needs to keep the previous selections in memory while switching between pages, and returning to a previous step (previous page) risk initializing the previous selections.

FIG. 2B is an examplary diagram of a user interface with individual active screens of a DLNA service application. As illustrated in FIG. 2B, the user interface arranges individual active screen areas by three still frames such that a single page covers all operation steps (a media server selection, media content selection and media player selection) to be performed. In this style of the user interface, the inventor(s) has experienced that the fixed frame areas preclude securing a sufficient portion of the screen required for the user to have an adequate legibility of the critical content selection area.

SUMMARY

In some embodiments, a DLNA device for performing a DLNA service scenario, comprises a display unit, an input unit, a communicator and a controller. The display unit is configured to display a user interface for performing the DLNA service scenario. The input unit is configured to receive, from a user, an operational instruction for the user interface. The communicator is configured to communicate with a DLNA network. The controller is configured to control the user interface displayed on the display unit and control the communicator. The user interface is configured to include a main layer providing an interface for media content selection, a first sublayer providing an interface for media server selection, and a second sublayer providing an interface for media player selection. The first sublayer and the second sublayer are temporarily displayed on at least a portion of the main layer according to the operational instruction.

In some embodiments, a DLNA device having a user interface for performing a DLNA service scenario, comprises a main layer, a first sublayer and a second sublayer. The main layer is configured to provide a media content selection interface. The first sublayer is configured to provide a media server selection interface. The second sublayer configured to provide a media player selection interface. The the first sublayer and the second sublayer are displayed on a portion of the main layer in a pull-down or pop-up manner according to an operational instruction of a user.

In some embodiments, a non-transitory computer readable medium comprises a computer program for performing a DLNA service scenario causing, when executed in a DLNA device including a display unit configured to display a user interface, a communicator configured to communicate with at least one DLNA device in a DLNA network and an input unit configured to receive an operational instruction for the user interface from a user. The DLNA device displays, on the display unit, a main layer to provide an interface for media content selection, detects the operational instruction, and displays, on a portion of the main layer, a first sublayer to provide an interface for media server selection and a second sublayer to provide an interface for media player selection in a pull-down or pop-up manner.

DETAILED DESCRIPTION

Figure 1A:
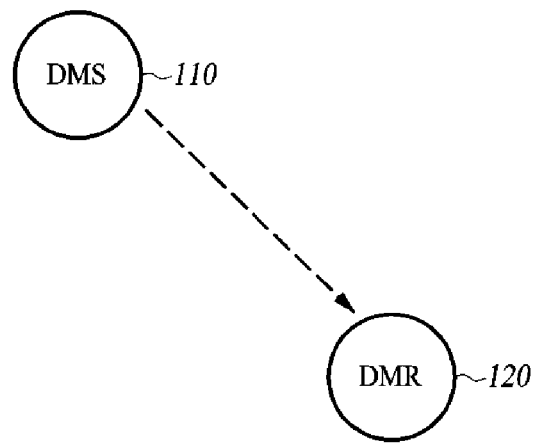
FIG. 1A is an examplary diagram of basic DLNA service scenario illustrating a 2-Box Push scenario.
Figure 1B:
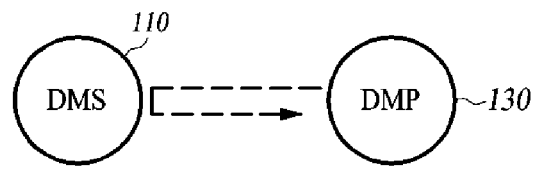
FIG. 1B is an examplary diagram of basic DLNA service scenario illustrating a 2-Box Pull scenario.
Figure 1C:
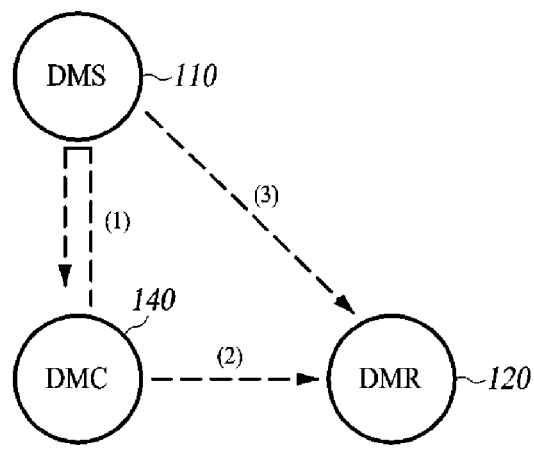
FIG. 1C is an examplary diagram of basic DLNA service scenario illustrating a 3-Box scenario.
Figure 2A:
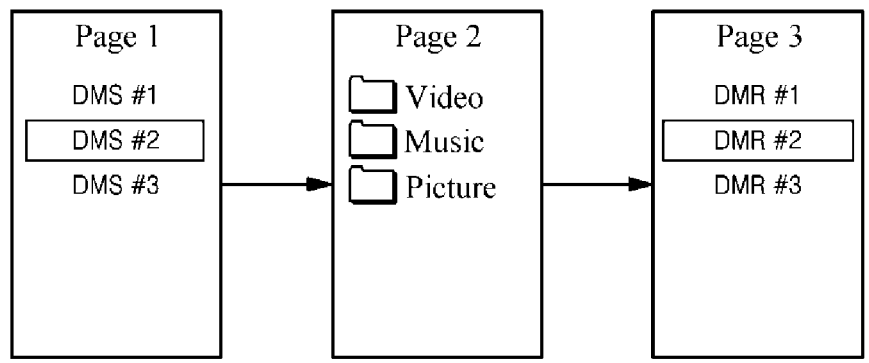
FIG. 2A is an examplary diagram of a user interface with three separate pages of a DLNA service application.
Figure 2B:
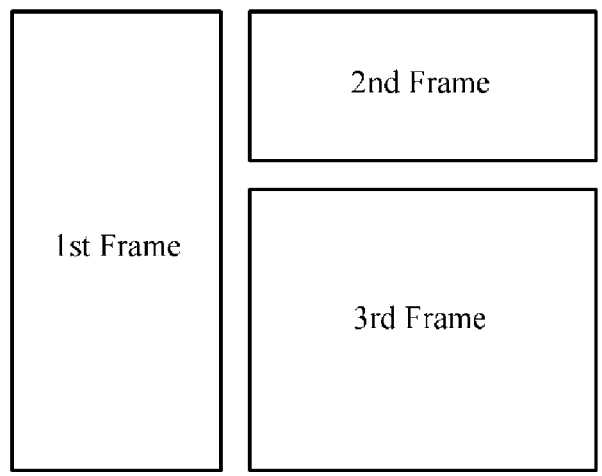
FIG. 2B is an examplary diagram of a user interface with individual active screens of a DLNA service application.

At least one embodiment of the present disclosure provides a DNLA system including a user interface configured to arrange an active screen area having slide menus so as to allow a user to easily retrieve desired content through a DMC function or a DMP function and output the same through a desired device.

Hereinafter, embodiments of the present disclosure will be described in detail with reference to the accompanying drawings. In the following description, like reference numerals designate like elements although the elements are shown in different drawings. Further, in the following description of the at least one embodiment, a detailed description of known functions and configurations incorporated herein will be omitted for the purpose of clarity and for brevity.

One or more embodiment of the present disclosure relates to a DLNA user interface and a DLNA device functioning as a control point in a home network in a DLNA environment using the same. According to one or more embodiments, the DLNA user interface is stored in a computer-readable recording/storage medium.

In some embodiments, the DLNA user interface does not separately differentiate one interface from another depending on the DLNA service scenarios (the 2-Box Push, 2-Box Pull and 3-Box scenarios) described above. In some embodiments, all of the above scenarios are supported through a series of processes (a media server selection process, a media content selection process, and a media player selection process) similar to the operations of the DMC device (operations of retrieving a DMS device in a DLNA network, identifying the content of the device and selecting a DMR device to play the content) in the 3-Box scenario.

A DLNA device for providing the DLNA user interface operates as a control point in a DLNA-based home network. Serving as the control point, this DLNA device is connected to diverse DLNA devices over a wired/wireless home network to perform the DLNA service scenarios. A DLNA device connected to the home network is capable of performing two or more of the DMS, DMP, DMR, and DMC functions. In some embodiments, the DLNA device as the control point is configured to perform all of the DMC, DMS and DMP functions. In some embodiments, the DLNA device itself providing the DLNA user interface is also recognized as a DMS device on the DLNA network, and is selected or controlled as a DMS device through the user interface.

Description will be given first of a device class of each DLNA device in a home network in the DLNA environment.

The DMS device has a capability to access media content in a Universal Plug and Play (UPnP) AV area, and serves to store the media content or provide the media content to a DMP device or a DMR device. The DMS device enables a DMC device to retrieve media content, and is equipped with broadcast middleware and a broadcast receiver for receiving digital broadcasts. Such functions of the DMS are performed by a mobile device, a personal computer, a CD player, a DVD player, an MP3 player, a set-top box, etc.

The DMP device functions to play the selected media content. Specifically, the DMP device selects and controls media content and play the selected media content. Such operations of the DMP are performed by a mobile device, a TV, a personal computer, etc.

The DMR device functions to play the selected media content. The operation of the DMR is performed by a TV, an AV receiver, a stereo speaker, etc.

The DMC device controls to play media content of the DMS device through the DMR device. A user retrieves media content of the DMS device through the DMC device to find desired media content, and control the DMS device to transmit the media content to a specific DMR device. Such DMC function is performed by a mobile device, a personal computer, etc.

Now, description will be given of a DLNA user interface and a DLNA device configured to perform DLNA service scenarios in a home network in the DLNA environment using the same, according to at least one embodiment of the present disclosure.

Figure 3:
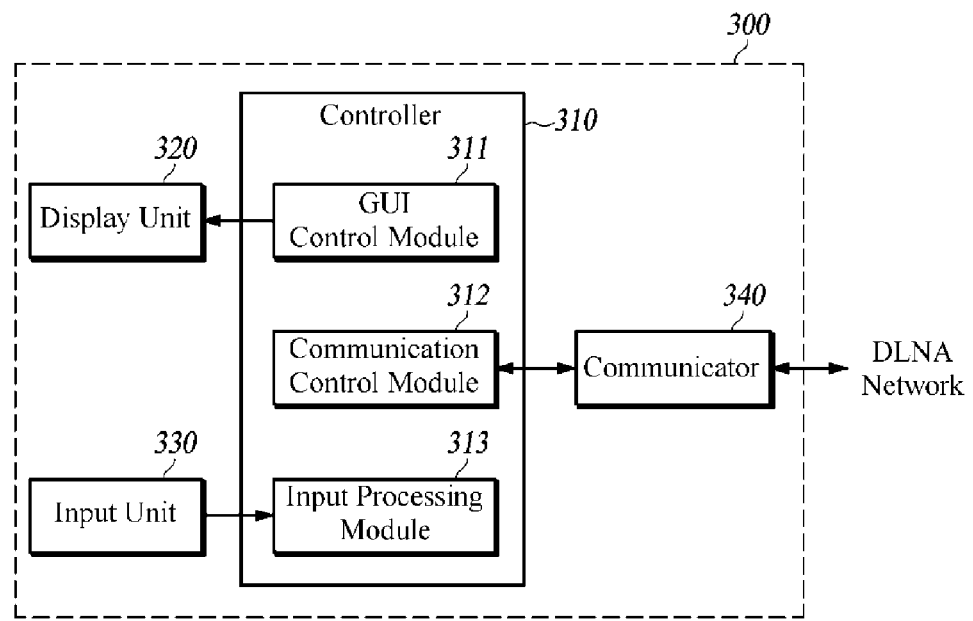
FIG. 3 is an examplary diagram of a configuration of a DLNA device for performing DLNA service scenarios, according to one or more embodiments.

FIG. 3 is an examplary diagram of a configuration of a DLNA device for performing DLNA service scenarios, according to at least one embodiment.

Although FIG. 3 shows only the parts necessary for the description of at least one embodiment, a controlling DLNA device 300 is configured in various ways according to the type and performance thereof.

As shown in FIG. 3, the DLNA device 300 configured to perform a DLNA service scenario according to the at least one embodiment of the present disclosure includes a display unit 320 (e.g., display screen such as touch screen) configured to display a user interface for implementing a DLNA service scenario, an input unit 330 configured to receive, from a user, a user selection instruction for the user interface, a communicator 340 configured to perform communication with a DLNA device on a DLNA network, and a controller 310 configured to control the user interface displayed on the display unit 320 and the communicator 340.

The input unit 330 receives, from the user, a user selection instruction for the user interface displayed on the display unit 320, and it is implemented through various input means according to the configuration and function of the DLNA device 300. For example, when the DLNA device 300 is a smartphone or a tablet PC, the input unit 330 is implemented through input means such as a touch screen, a keypad, and a voice recognition sensor. When the DLNA device 300 is a personal computer, and the input unit 330 is implemented through input means such as a mouse and a keyboard. In particular, in case of a smartphone with a touchscreen applied, the input unit 330 and the display unit 320 is replaced with the touch screen. The input unit 330 delivers, to the controller 310, the user selection instruction input by the user.

When the input unit 330 is implemented through a mouse, the "selection instruction" of the user for a graphic user interface (GUI) element is an event for the GUI element, such as 'Click', 'Drag', and 'Mouse over'. When the input unit 330 is implemented through a touch sensor of a touch screen, the selection instruction of the user is events such as "Tapping", "Drag", "Flicking" and "Press".

Herein, the event Mouse Over refers to an operation of positioning a mouse cursor on a specific object for a certain time. The event Tapping, which is a motion of gently pressing and releasing a selected object (a number, a character, a sign, an icon, or the like) once, refers to a touch input such as clicking a mouse in a general PC. The event Drag is an operation of moving a specific selected object to a specific position while pressing (touching) the object and then releasing the object. When Drag occurs, the object under depression keeps moving in its direction of movement, and then it is fixed by the releasing motion. The event Flicking is a motion of touching and moving a contact point in one of specific directions (Up, Down, Left, Right, and Diagonal directions) and then releasing the contact point. A specific operation is processed according to the movement direction and speed of the Flicking event. The Flicking event refers to an operation of, for example, turning a page. The event Press refers to an operation of contacting and then persistently pressing a contact point, and the event Release refers to an operation of releasing a contact point after touching the contact point.

The communicator 340 includes a circuit that communicates with other DLNA devices in a DLNA network through various wired/wireless communication schemes.

The controller 310, which is implemented with a central processing unit (CPU) or a microprocessor, controls overall operations of the DLNA device 300. In particular, the controller 310 executes a DLNA service application to enable the DLNA device 300 to perform operations of the DMC, DMP or DMS.

The controller 310 initially provides the display unit 320 with a list of devices to perform the operations of the DMS and DMR devices among the DLNA devices currently connected to the home network according to a user's request such that the user selects a DLNA device to play media content. In addition, the controller 310 provides a corresponding user interface to the display unit 320 such that the user retrieves media content stored in a DMS device and play the same through a desired DMR device. Then, the controller 310 stores user-selected information in a memory (not shown) as DLNA scenario information. In addition, the controller 310 communicates with other DLNA devices on the DLNA network through the communicator 340 in order to implement DLNA scenario information. In order to perform such operations, the controller 310 includes a GUI control module 311, a communication control module 312 and an input processing module 313.

Hereinafter, description will be given of a DLNA user interface displayed on the display unit 320 and operations of the controller 310 controlling the same, with reference to FIGS. 4 to 10. The user interface described below is implemented on the display unit 320 and controlled by the GUI control module 311 included in the controller 310, the subject (GUI control module: 311) to control GUI elements will not be mentioned for clear description of operations of the DLNA user interface.

Operations for performing a DLNA service scenario are broadly classified into media server selection, media content selection and media player selection.

In some embodiment, user interfaces for such operations for performing the DLNA service scenario provide, a main layer 400 configured to provide an interface for media content selection, a first sublayer 500 configured to provide an interface for media server selection, and a second sublayer 800 configured to provide an interface for media player selection. Herein, the first sublayer 500 and the second sublayer 800 are displayed at a portion of the main layer 400 in the manner of a "Pull-down or pop-up" according to an operational instruction of a user. "Pull-down or pop-up" refers to temporarily displaying a sublayer on a display screen according to the operational instruction of the user.

In some embodiments, the first sublayer and the second sublayer are displayed either on left and right sides of the main layer or on upper and lower sides of the main layer.

In some embodiments, the first sublayer and the second sublayer are slidably displayed on the main layer in a pull-down manner.

In some embodiments, the controller deactivates the main layer while one of the first sublayer and the second sublayer is being displayed on the display unit.

In some embodiments, the controller changes at least one of tone or transparency of the main layer to a predetermined value when deactivating the main layer.

In some embodiments, the controller is configured to display, on the first sublayer, a list of digital media server (DMS) devices connected to the DLNA network, and display, on the second sublayer, a list of digital media renderer (DMR) devices connected to the DLNA network.

In some embodiments, the DLNA device is configured to perform operations of the DMC, DMP and DMS, the DLNA device performing the DLNA service scenario as a local DLNA device.

In some embodiments, the list of DMS devices includes the local DLNA device.

In some embodiments, the list of DMR devices includes the local DLNA device.

In some embodiments, the controller is configured to display, on the main layer, a list of content items contained in a DMS device in the list of DMS devices displayed on the first sublayer when a user selection instruction is input to the DMS device.

In some embodiments, the controller is configured to set, into a playlist, at least one content item in a list of content items displayed on the main layer when a user selection instruction for the content is input.

In some embodiments, the second sublayer includes three sections of a first section, a second section and a third section, wherein the list of DMR devices connected to the DLNA network is displayed in the first section, a control media rendering panel and a media rendering controller panel are displayed in the second section, and a list of the at least one piece of content set as the playlist is displayed in the third section.

In some embodiments, the controller is configured to render, on the control media rendering panel, the at least one content item set as the playlist, and display, on the media rendering controller panel, a controller GUI element corresponding to a type of the content item rendered on the control media rendering panel.

In some embodiments, the controller is responsive to the user selection instruction input to a DMR device in the list of DMR devices displayed on the second sublayer, for requesting a DMS device having the at least one content item set in the playlist to transmit the at least one content item to the DMR device.

In some embodiments, the user interface is configured to include a pair of toggle bars either on left and right sides of the main layer or on upper and lower sides of the main layer; and display the first sublayer or the second sublayer on the main layer when a user selection instruction is input to one of the toggle bars.

In some embodiments, the input unit is implemented through at least one of a mouse, a keyboard, a keypad, a voice recognition sensor and a touch sensor.

Figure 4:
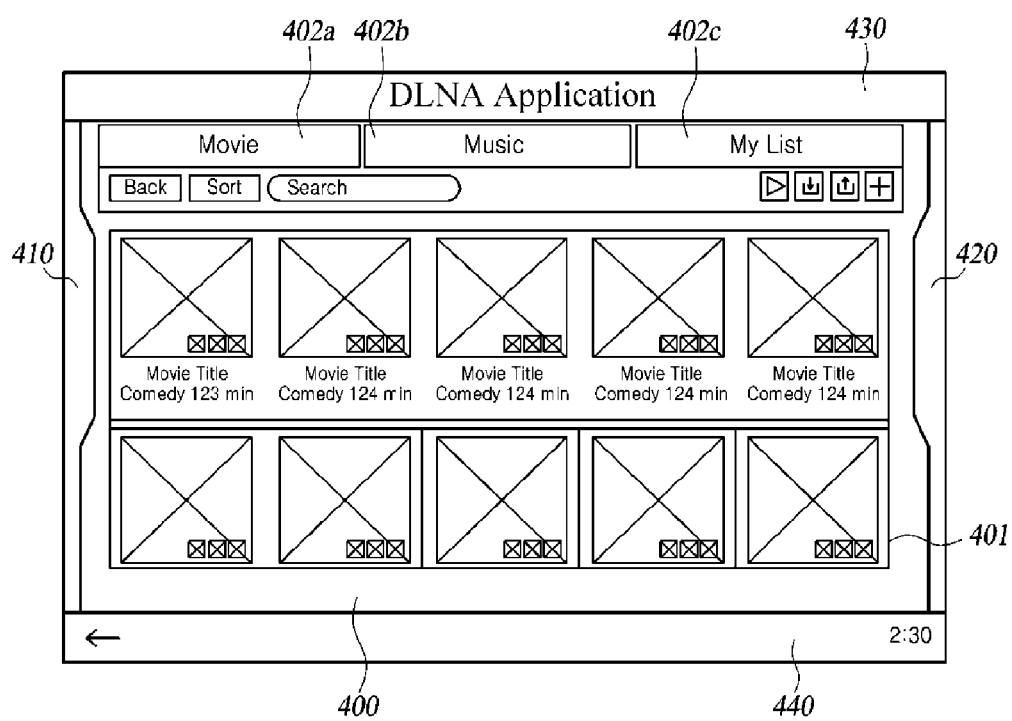
FIG. 4 is an examplary diagram of a user interface for the operation of media content selection, according to one or more embodiments.
Figure 5:
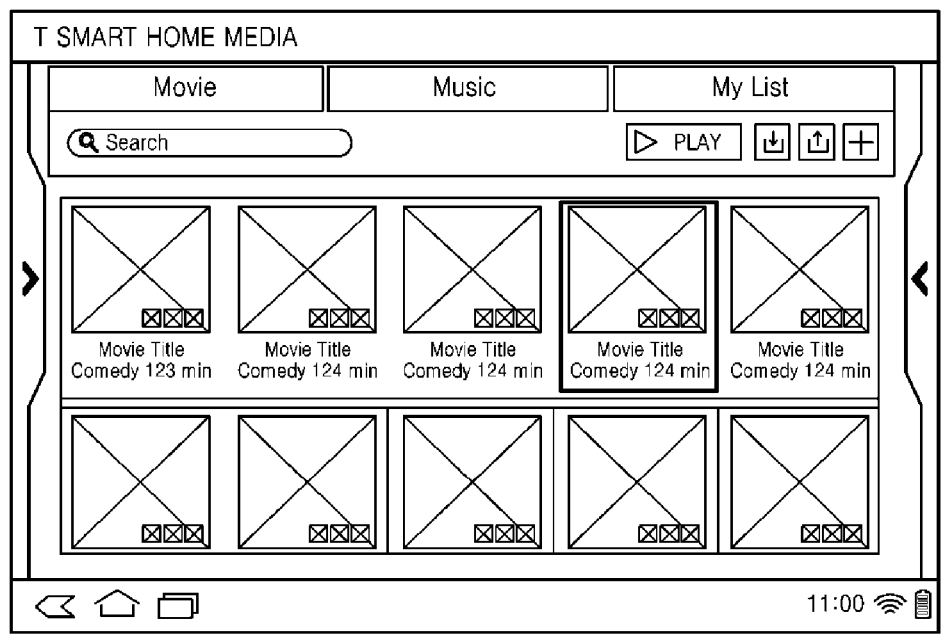
FIG. 5 is an examplary diagram of an implementation of the user interface shown in FIG. 4, according to one or more embodiments.

FIG. 4 is an examplary diagram of a user interface constituting a media content selection area, and FIG. 5 is an examplary diagram of an implementation of the user interface shown in FIG. 4.

The execution screen of a software application illustrated in FIG. 4 generally includes a top indicator 430 on which the title of an application is displayed, a bottom indicator 440 on which state information on the application is displayed, and a mainframe in which the user interface is implemented.

In the mainframe, the main layer 400 for providing an interface for media content selection is displayed along with a GUI object which includes a pair of toggle bars 410 and 420 disposed on the left and right sides of the main layer 400, respectively. The toggle bars 410 and 420 are positioned at the top and bottom of the main layer 400 depending on the aspect ratio of the main layer 400, and also configured in the form of a button rather than a bar. The pair of toggle bars 410 and 420 is an example of a GUI object for sensing a user's operational instruction about whether or not to display the first sublayer 500 and the second sublayer 800.

The toggle bars 410 and 420 are suitable for a case in which the operational instruction of the user for executing the first sublayer 500 and the second sublayer 800 is a Click event or a Drag event. On the other hand, the toggle bars 410 and 420 are omitted where the operational instruction of the user corresponds to a Mouse Over event applied to a specific area of the main layer 400 (e.g., the left and right side parts of the main layer 400). Hereinafter, operations of a user interface will be described for when the toggle bars 410 and 420 are provided.

A list of content items contained in a selected DMS device is displayed on the main layer 400. When the application is executed, a list of content items contained in a local DLNA device or contained in a DMS device accessed most recently is displayed as a default value.

The list of content items displayed on the main layer 400 is classified and displayed according to the types of the content contained in the DMS device. The list of content classified into digital video, digital music and digital image according to user selection is provided by arranging, on the main layer 400, a user interface in the form of tab menus 402a to 402c allowing selection of content types. Additionally, the list of content items is provided in the form of a directory or a full list, and each content is represented as a thumbnail, a title or an icon.

When a user selection instruction is input to the toggle bars 410 and 420, a sublayer for providing a user interface for the operation of media server selection and another sublayer for providing an user interface for the operation of media player selection are displayed. Each sublayer is displayed in the Pop-up manner or is slidably displayed over the main layer 400 in the Pull-down manner. Hereinafter, for clarity of description, the sublayer on which the media server selection area is displayed will be referred to as a 'first sublayer', and the other sublayer where the media player selection area is displayed will be referred to as a 'second sublayer'.

The user selects at least one content item in the list of content items displayed on the main layer 400. Then, the selected content is included in a playlist to be rendered in a DMR device selected as a media player.

Figure 6:
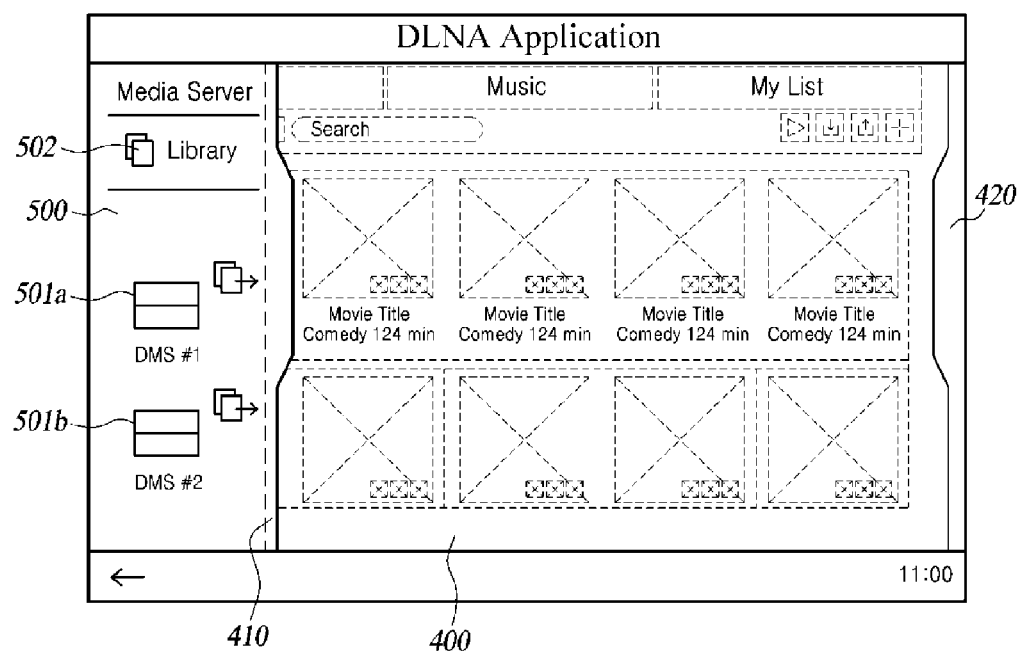
FIG. 6 is an examplary diagram of a user interface for the operation of media server selection, according to one or more embodiments.
Figure 7:
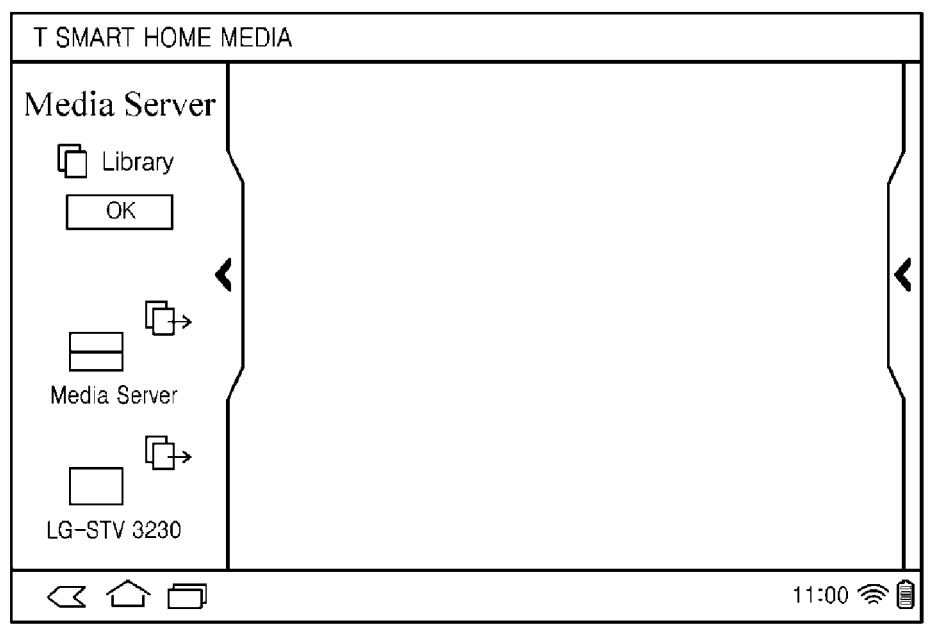
FIG. 7 is an examplary diagram of an implementation of the user interface shown in FIG. 6, according to one or more embodiments.

FIG. 6 is an examplary diagram of a user interface for the operation of media server selection, according to one or more embodiments and FIG. 7 is an examplary diagram of an implementation of the user interface shown in FIG. 6, according to one or more embodiments.

FIG. 6 illustrates the first sublayer 500 displayed on the main layer 400 as a user selection instruction is input for the toggle bar 410 positioned on the left side of the main layer 400. The media server selection area is displayed on the first sublayer 500. A list of DMS devices (see 501a and 501b) on the DLNA network is provided in the media server selection area. Where the DLNA device 300 for executing the above application has the DMS function, the DLNA device 300 itself is also included in the list of DMS devices.

The main layer 400 is configured to be deactivated while the first sublayer 500 is displayed. When the main layer 400 is deactivated, a color attribute, i.e., at least one of tone and transparency of the main layer 400 is adjusted to a predetermined value to visually inform on the deactivated state, and a message indicating the deactivated state is displayed on the main layer 400.

Once the user completes the selection of one device in the list of DMS devices provided on the first sublayer 500, the first sublayer 500 slides away and disappears from the main layer 400, and the main layer 400 is activated. The list of content items contained in the selected DMS is displayed on the activated main layer 400. The user selects at least one piece of content from the displayed list of content items, and the at least one selected content item is included in a playlist to be rendered in a DMR device which has been selected or is to be selected as a media player.

Meanwhile, a Library button 502 is provided on the first sublayer 500 where the interface of the operation of media server selection is provided. When the user selects the Library button 502, an integrated list of content items included in all DMS devices connected to the DLNA network is provided on the main layer 400. The integrated list is collected when the application is executed, periodically collected during execution of the application, or collected when the user selects the Library button.

When the user selects the toggle bar 420 positioned on the right side of the main layer 400, the second sublayer 800 is activated with the media player selection area displayed thereon. The second sublayer 800 is displayed on the main layer 400 in the Pop-up manner, or is displayed by sliding in the Pull-down manner. The first sublayer 500 and the second sublayer 800 do not appear simultaneously. Rather, when one of the sublayers is selected to appear, the other one disappears.

Figure 8:
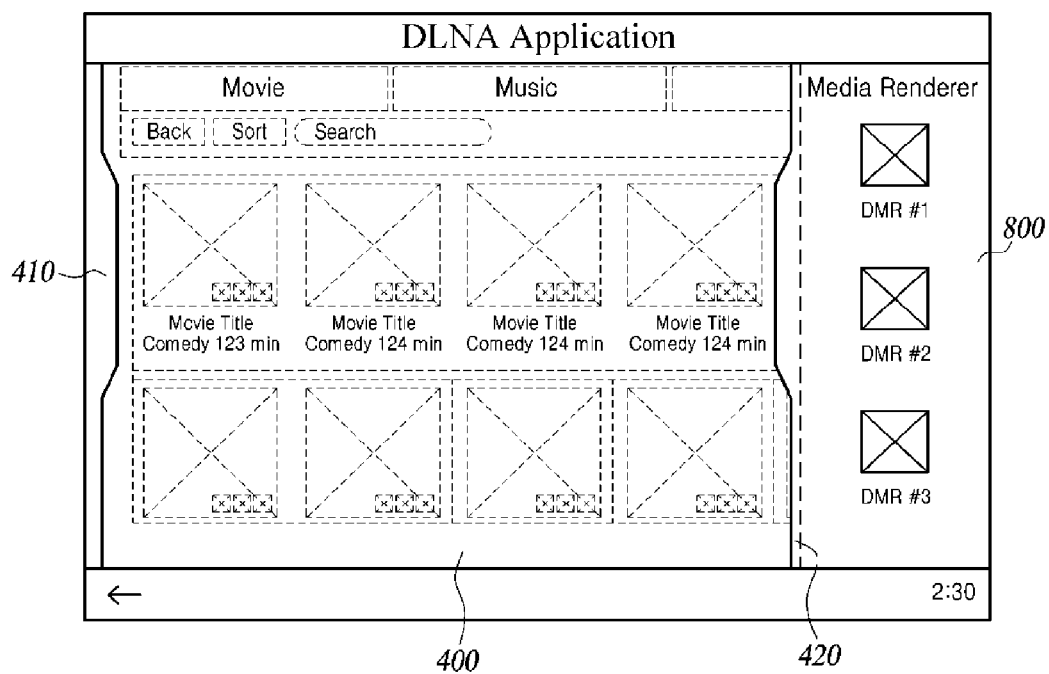
FIG. 8 is an examplary diagram of a user interface for the operation of media player selection, according to one or more embodiments.

FIG. 8 is an examplary diagram of a user interface for the operation of media player selection according to one or more embodiments.

FIG. 8 illustrates the second sublayer 800 displayed on the main layer 400 as a user selection instruction is input for the toggle bar 420 positioned on the right side of the main layer 400. A user interface for the operation of media player selection is displayed on the second sublayer 800. The user interface for the operation of media player selection provides a list of DLNA devices to perform the DMR function on the DLNA network. A DLNA device included in the list has not only the DMR function, but also the DMC, DMS and DMP functions. Accordingly, one DLNA device is included in both the list displayed on the first sublayer 500 and the list displayed on the second sublayer 800.

Figure 9:
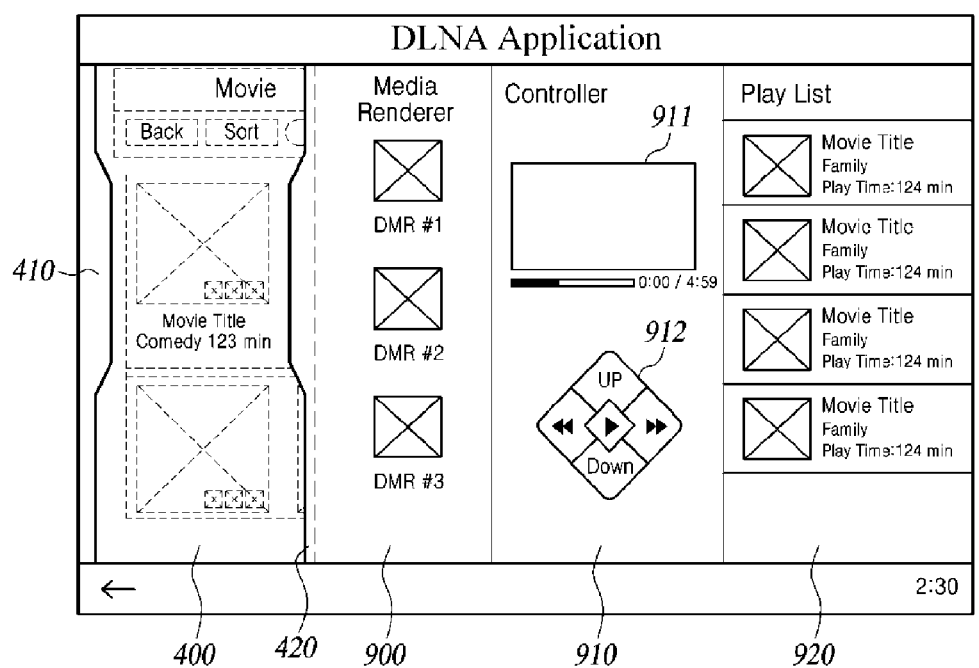
FIG. 9 is an examplary diagram of a user interface for media player selection and subsequent playback, according to one or more embodiments.
Figure 10:
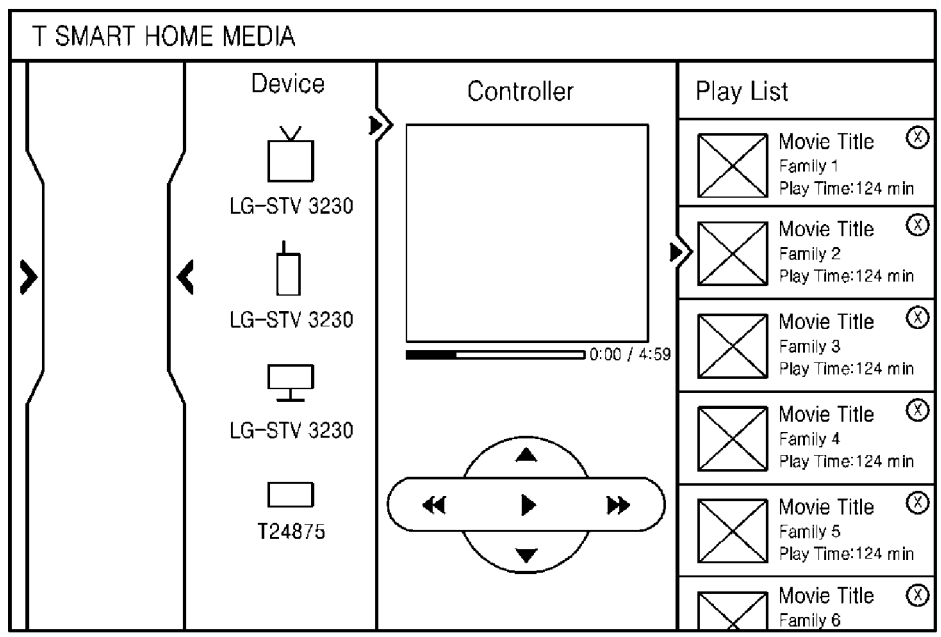
FIG. 10 is an examplary diagram of an implementation of the user interface shown in FIG. 9, according to one or more embodiments.

FIG. 9 is an examplary diagram of a user interface appearing after media player selection, according to one or more embodiments, and FIG. 10 is an exemplary diagram of an implementation of the user interface shown in FIG. 9, according to one or more embodiments.

The second sublayer 800 includes three sections 900, 910 and 920. The user interface for the operation of media player selection shown in FIG. 8 is displayed in the first section 900. The user interface for the operation of media player selection provides a list of DLNA devices performing the DMR function on the DLNA network. A DLNA device included in the list has not only the DMR function, but also the DMC, DMS and DMP functions. Accordingly, one DLNA device is included in both the list displayed on the first sublayer 500 and the list displayed on the second sublayer 800. A control media rendering panel 911 and a media rendering controller panel 912 are displayed in the second section 910. A content included in the playlist displayed in the third section 920 is rendered on the control media rendering panel 911. Rendering controller GUI elements corresponding to the type of the content rendered on the media rendering panel for control 911 are displayed on the media rendering controller panel 912. Content items included in the playlist are rendered in a DMR device. The user checks a screen for the rendering in a DMR device through the control media rendering panel 911, and controls the screen for the rendering in the DMR device through the rendering controller GUI elements provided to the media rendering controller panel 912.

As seen from the description above, instead of dedicating individual interfaces to the respective DLNA service scenarios, the DLNA user interface in some embodiments of the present disclosure offers an integrated user interface capable of supporting the all scenarios through the process of media server selection, media content selection and media player selection. The following DLNA service scenarios are performed through a user interface for the operation of media server selection, a user interface for the operation of media content selection and a user interface for the operation of media player selection.

First, the user selects a playlist and a media player for playback through the user interfaces. The media content included in the playlist is a content item stored in the DLNA device 300 that functions as a control point or a content item stored in a DMS device positioned on the DLNA network.

When the user completes selection of the playlist and the media player for playback, the DLNA device 300 instructs a DMR device to play the content included in the playlist, and the DMR device in turn makes a request for transmission of the content to the corresponding DMS device.

When a DMS device storing the content included in the playlist and a DMR device selected as a media player for playback are the same DLNA device, such DLNA device is adapted to have both the DMS function and the DMR function. In this case, the DLNA device locally plays the content. In other words, the DLNA device renders the content stored in its own storage space on its own rendering screen.

When the DMS device storing the content included in the playlist and the DMR device selected as a media player for playback are not a local DLNA device but separate DLNA devices, then the 3-Box scenario is performed among the DLNA service scenarios.

When the DMS device storing the content included in the playlist is a local DLNA device and the DMR device selected as a media player for playback is a separate DLNA device, then the 2-Box Push scenario is performed among the DLNA service scenarios.

When a DLNA device selected as a media player is the DLNA device 300 and the DMS device storing the content included in the playlist is a separate DLNA device, then the 2-Box Pull scenario is performed among the DLNA service scenarios.

As described above, the present disclosure in some embodiments provides a DLNA user interface configured to more intuitively use a DLNA device functioning as a control point in a home network in a DLNA environment. According to some embodiments of the present disclosure, by implementing a user interface for the operations of media server selection, media content selection and media player selection through slide menus, the largest possible area for each selection operation is secured, and a more convenient DLNA user interface is provided. According to some embodiments of the present disclosure, a device (a media player) on a home network uses media content provided by a media server on the home network based on the integrally managed media content information (e.g., location information, a list of media content, etc.) collected through multiple media servers. According to some embodiments of the present disclosure, by providing an integrated DLNA user interface configured to perform various DLNA service scenarios through a single selection operation, the user sets the various DLNA service scenarios through the single selection operation.

According to the user interface of the DLNA application described in the present disclosure, various DLNA service scenarios are performed in the same manner from the user's point of view. In performing the DLNA service scenarios, the user needs not be aware of which of the DLNA devices connected to the DLNA network functions as the DMS device or the DMR device. In other words, the user is only required to recognize that content stored in a device connected to the DLNA network is played by a certain device connected to the DLNA network, and not to recognize which function each DLNA device has among the DMC, DMS, DMR and DMP and which DLNA device needs to be designated as a device to perform the DMC, DMS, DMR and DMP functions according to each DLNA service scenario.

Some embodiments as described above are implemented in the form of one or more program commands that are read and executed by a variety of computer systems and be recorded in any non-transitory, computer-readable recording medium. The non-transitory computer-readable recording medium includes a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from characteristics of the disclosure. That is, it is understood that the present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

The invention claimed is:

1. A digital living network alliance (DLNA) device for performing a DLNA service scenario, the device comprising one or more application specific integrated circuits (ASICs) to implement:
  a display unit configured to display a user interface for performing the DLNA service scenario, wherein the user interface comprises a main layer a first sublayer, and a second sublayer, and the main layer includes a first toggle bar configured to activate the first sublayer and a second toggle configured to activate the second sublayer;
  an input unit configured to receive, from the first toggle bar or the second toggle bar, an event for selecting either the first layer or the second layer of the user interface;
  a communicator configured to communicate with a DLNA network; and
  a controller configured to control the display unit to activate the main layer, and control the communicator,
  wherein when the controller implements an operational instruction corresponding to the received event, the controller control the display unit to
    deactivate the main layer, and
    activate the first sublayer or the second sublayer according to the received event by displaying the first sublayer or the second sublayer in a manner of sliding out to a screen area of the main layer on the display unit, and deactivating the main layer on the display unit,
  wherein when the first layer or the second layer is deactivated, the controller controls the display unit to display the main layer only, and
  wherein the main layer provides an interface for media content selection, the first sublayer provides an interface for media server selection, and the second sublayer provides an interface for media player selection
  wherein the controller is configured to set, into a playlist, at least one content item in a list of content items displayed on the main layer when a user selection instruction for the content item is input,
  wherein the second sublayer comprises three sections of a first section, a second section and a third section, wherein the list of digital media renderer (DMR) devices connected to the DLNA network is displayed in the first section, a control media rendering panel and a media rendering controller panel are displayed in the second section, and a list of the at least one piece of content set as the playlist is displayed in the third section,
  wherein the controller is configured to render, on the control media rendering panel, the at least one content item; and display, on the media rendering controller panel, a controller GUI element corresponding to a type of the at least one content item rendered on the control media rendering panel.

2. The DLNA device of claim 1, wherein the controller is configured to deactivate the main layer when at least one of the first sublayer and the second sublayer is displayed on the main layer in a pull-down or pop-up manner.

3. The DLNA device of claim 2, wherein the controller is configured to change at least one of tone or transparency of the main layer to a predetermined value when deactivating the main layer.

4. The DLNA device of claim 2, wherein the controller is configured to control the user interface to
  display, on the first sublayer, a list of digital media server (DMS) devices connected to the DLNA network, and
  display, on the second sublayer, a list of digital media renderer (DMR) devices connected to the DLNA network.

5. The DLNA device of claim 4, wherein
  the DLNA device is configured to perform operations of a digital media controller (DMC) and the DMS, as a local DLNA device, and
  the list of DMS devices includes the local DLNA device.

6. The DLNA device of claim 4, wherein
  the DLNA device is configured to perform operations of a digital media controller (DMC) and a digital media player (DMP), as a local DLNA device, and
  the list of DMR devices includes the local DLNA device.

7. The DLNA device of claim 4, wherein the controller is configured to control the user interface to display, on the main layer, a list of content items contained in the DMS device, when a user selection instruction is input into a DMS device in the list of DMS devices.

8. The DLNA device of claim 2, wherein the first sublayer and the second sublayer are slidably displayed on the main layer in a pull-down manner.

9. The DLNA device of claim 1, wherein the controller is configured to,
In response to the user selection instruction input to a DMR device in the list of DMR devices displayed on the second sublayer,
request a DMS device in the list of DMS devices and having the at least one content item set in the playlist to transmit the at least one content item to the DMR device.

10. The DLNA device of claim 1, wherein the first sublayer and the second sublayer are displayed either on left and right sides of the main layer or on upper and lower sides of the main layer.

11. The DLNA device of claim 1, wherein the first sublayer slides away or disappears if the user completes the selection of one device in the list of DMS devices provided on the first sublayer.

12. The DLNA device of claim 1, wherein the first sublayer and the second sublayer do not appear simultaneously.

13. The DLNA device of claim 1, wherein the user interface is configured to
include a pair of toggle bars either on left and right sides of the main layer or on upper and lower sides of the main layer; and
display the first sublayer or the second sublayer on the main layer when a user selection instruction is input to one of the toggle bars.

14. The DLNA device of claim 1, wherein the input unit comprises at least one of a mouse, a keyboard, a keypad, a voice recognition sensor and a touch sensor.

15. A method performed by a digital living network alliance (DLNA) device having a user interface for performing a DLNA service scenario, the device comprising one or more application specific integrated circuits (ASICs) to implement:
displaying a main layer of the user interface,
wherein the user interface comprises the main layer, a first sublayer and a second sublayer, and the main layer includes a first toggle bar configured to activate the first sublayer and a second toggle configured to activate the second sublayer;
receiving, from the first toggle bar or the second toggle bar, an event for selecting either the first layer or the second layer of the user interface;
deactivating the main layer, when the controller implements an operational instruction corresponding to the received event, and
activating the first sublayer or the second sublayer according to the received event by displaying the first sublayer or the second sublayer in a manner of sliding out to a screen area of the main layer, and deactivating the main layer,
wherein when the first layer or the second layer is deactivated, the main layer only is displayed, and
wherein the main layer provides an interface for media content selection, the first sublayer provides an interface for media server selection, and the second sublayer provides an interface for media player selection.

16. The method of claim 15, wherein
the first sublayer is configured to display a list of digital media server (DMS) devices connected to a DLNA network to which the DLNA device is connected, and
the second sublayer is configured to display a list of digital media renderer (DMR) devices connected to the DLNA network.

17. The method of claim 16, wherein
the DLNA device is configured to perform operations of a digital media controller (DMC), a digital media player (DMP) and the DMS, as a local DLNA device, and
the list of DMS devices and the list of DMR devices include the local DLNA device.

18. The method of claim 17, wherein at least one content item in a list of content items displayed on the main layer is set into a playlist when a user selection instruction for the at least one content item is input.

19. The method of claim 18, wherein
in response to the user selection instruction input to a DMR device in the list of DMR devices displayed on the second sublayer,
requesting a DMS device in the list of DMS devices and having the at least one content item set into the playlist to transmit the at least one content item to the DMR device.

20. A non-transitory computer readable medium storing a computer program for performing a DLNA service scenario causing, when executed in a DLNA device including one or more application specific integrated circuits (ASICs) to implement a display unit for displaying a user interface, a communicator for communicating with a DLNA network and an input unit configured to receive an operational instruction for the user interface from a user, the ASICs of the DLNA device to execute the computer program to implement:
displaying a main layer of the user interface,
wherein the user interface comprises the main layer, a first sublayer and a second sublayer, and the main layer includes a first toggle bar configured to activate the first sublayer and a second toggle configured to activate the second sublayer;
detecting, from the first toggle bar or the second toggle bar, an event for selecting either the first layer or the second layer of the user interface;
deactivating the main layer, when the controller implements an operational instruction corresponding to the received event, and
activating the first sublayer or the second sublayer according to the received event by displaying the first sublayer or the second sublayer in a manner of sliding out to a screen area of the main layer, and deactivating the main layer,
wherein when the first layer or the second layer is deactivated, the main layer only is displayed, and
wherein the main layer provides an interface for media content selection, the first sublayer provides an interface for media server selection, and the second sublayer provides an interface for media player selection.

* * * * *